US011164075B2

(12) United States Patent
Liu et al.

(10) Patent No.: US 11,164,075 B2
(45) Date of Patent: Nov. 2, 2021

(54) EVALUATION METHOD AND APPARATUS BASED ON TEXT ANALYSIS, AND STORAGE MEDIUM

(71) Applicant: TENCENT TECHNOLOGY (SHENZHEN) COMPANY LIMITED, Shenzhen (CN)

(72) Inventors: Hongzhi Liu, Shenzhen (CN); Jie Jiang, Shenzhen (CN); Juhong Wang, Shenzhen (CN); Gang Guan, Shenzhen (CN); Zhonghai Wu, Shenzhen (CN); Xing Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1037 days.

(21) Appl. No.: 15/728,128

(22) Filed: Oct. 9, 2017

(65) Prior Publication Data
US 2018/0032870 A1      Feb. 1, 2018

Related U.S. Application Data

(63) Continuation of application No. PCT/CN2016/081998, filed on May 13, 2016.

(30) Foreign Application Priority Data

Oct. 22, 2015 (CN) .......................... 201510695316.1

(51) Int. Cl.
*G06N 3/08* (2006.01)
*G06N 20/00* (2019.01)
(Continued)

(52) U.S. Cl.
CPC .............. *G06N 3/08* (2013.01); *G06N 3/084* (2013.01); *G06N 5/003* (2013.01); *G06N 7/005* (2013.01);
(Continued)

(58) Field of Classification Search
CPC ...... G06Q 20/223; G06Q 40/025; G06N 3/08; G06N 5/003; G06N 20/20; G06N 20/00
See application file for complete search history.

(56) References Cited

U.S. PATENT DOCUMENTS

| | | | |
|---|---|---|---|
| 2012/0023006 A1 | 1/2012 | Roser et al. | |
| 2015/0142446 A1* | 5/2015 | Gopinathan | G06Q 40/025 704/270 |

FOREIGN PATENT DOCUMENTS

| | | |
|---|---|---|
| CN | 102789498 | 11/2012 |
| CN | 103093280 | 5/2013 |

(Continued)

OTHER PUBLICATIONS

Wang, Gang, et al. "Two credit scoring models based on dual strategy ensemble trees." Knowledge-Based Systems 26 (2012): 61-68. (Year: 2012).*

(Continued)

*Primary Examiner* — Benjamin P Geib
(74) *Attorney, Agent, or Firm* — Oblon, McClelland, Maier & Neustadt, L.L.P.

(57) ABSTRACT

Aspects of the disclosure provide an information processing apparatus that includes interface circuitry and processing circuitry. The interface circuitry is configured to obtain a text authored by a person. The processing circuitry is configured to analyze the text to obtain measurements of language features of the person, input the measurements of the language features into an evaluation model that is trained to predict a score as a function of the language features, determine a specific score for the person based on the evaluation model and output the specific score of the person for predicting a behavior of the person.

20 Claims, 7 Drawing Sheets

(51) Int. Cl.
    *G06Q 40/02* (2012.01)
    *G06Q 40/06* (2012.01)
    *G06Q 10/06* (2012.01)
    *G06N 5/00* (2006.01)
    *G06N 7/00* (2006.01)
    *G06N 20/20* (2019.01)
    *G06Q 10/04* (2012.01)

(52) U.S. Cl.
    CPC ............. *G06N 20/20* (2019.01); *G06Q 10/04* (2013.01); *G06Q 10/0635* (2013.01); *G06Q 40/025* (2013.01); *G06Q 40/06* (2013.01)

(56) References Cited

FOREIGN PATENT DOCUMENTS

| | | |
|---|---|---|
| CN | 103154991 | 6/2013 |
| CN | 104616198 | 5/2015 |
| CN | 104657422 | 5/2015 |
| CN | 104866969 | 8/2015 |

OTHER PUBLICATIONS

Emekter, Riza, et al. "Evaluating credit risk and loan performance in online Peer-to-Peer (P2P) lending." Applied Economics 47.1 (2015): 54-70. (Year: 2015).*

Jin, Yu, and Yudan Zhu. "A data-driven approach to predict default risk of loan for online peer-to-peer (P2P) lending." 2015 Fifth International Conference on Communication Systems and Network Technologies. IEEE, 2015. (Year: 2015).*

Larrimore, Laura, et al. "Peer to peer lending: The relationship between language features, trustworthiness, and persuasion success." Journal of Applied Communication Research 39.1 (2011): 19-37. (Year: 2011).*

Office Action dated Jun. 5, 2018 in Chinese Patent Application No. 201510695316.1, p. 1-10 (With Concise English Translation).

Written Opinion of the International Searching Authority dated Aug. 22, 2016 in PCT/CN2016/081998 filed May 13, 2016, p. 1-9 (With English Translation).

International Preliminary Report on Patentability dated Aug. 22, 2016 in PCT/CN2016/081998 filed May 13, 2016, p. 1-4 (With English Translation).

International Search Report dated Aug. 22, 2016 in PCT/CN2018/081998 filed May 13, 2016. (With English Translation).

* cited by examiner

EVALUATION METHOD AND APPARATUS BASED ON TEXT ANALYSIS, AND STORAGE MEDIUM

RELATED APPLICATION

This application is a continuation of International Application No. PCT/CN2016/081998, filed on May 13, 2016, which claims priority to Chinese Patent Application No. 201510695316.1, whose applicant is Tencent Technology (Shenzhen) Co., Ltd. and entitled "CREDIT RISK EVALUATION METHOD AND APPARATUS BASED ON TEXT ANALYSIS" filed on Oct. 22, 2015. The entire disclosures of the prior applications are hereby incorporated by reference herein in their entirety.

FIELD OF THE TECHNOLOGY

The present disclosure relates to the Internet financial field, and in particular, to a credit risk method and apparatus based on text analysis and a storage medium.

BACKGROUND OF THE DISCLOSURE

With the development of the times, computers and networks have been rapidly popularized, and the Internet has been unconsciously closely related to various aspects of people's life. In recent years, the impact of the Internet has gradually spread to the financial field, and the Internet finance has gradually entered the public view. In theory, any service that is related to finance and handled online by using a network belongs to Internet finance. In general, there are 6 common categories, which are respectively big data finance, third party payment, peer-to-peer (P2P) network loans, crowdsourcing, information financial institutions, and Internet financial portals.

As an emerging field of the Internet financial industry, P2P net loan is growing at a surprising speed and has attracted wide attention, and opportunities and challenges have also simultaneously emerged. Because of the special historical background of our country, the development speed of P2P net loan in our country is particularly rapid, and the scale is also relatively large. China's financial field is subject to financial control to some extent, and increasingly diversified financial requirements of a large number of small and medium enterprises and individuals have not been satisfied with the existing financial services, and this facilitates rapid development of P2P network loan. Because of this, due to problems of excessively fast innovation of P2P network loan and lack of supervision, P2P network loan is prone to systematic risks represented by amount and maturity mismatch, illegal fund-raising and liquidity traps. On the aspect of payment, P2P network loan still lacks a perfect certification system and lacks fund supervision, and faces the risks such as transaction frauds and privacy disclosure. On the aspect of financing, the credit risk problem also becomes prominent with the improvement of the social fund application efficiency.

SUMMARY

In view of this, embodiments of the present disclosure provide a credit risk evaluation method and apparatus based on text analysis, and a storage medium to resolve at least one problem in the existing technology, so as to evaluate a credit risk of a borrower, thereby providing important decision basis for an investor during investment.

Technical solutions of the embodiments of the present disclosure are implemented as follows.

Aspects of the disclosure provide an information processing apparatus that includes interface circuitry and processing circuitry. The interface circuitry is configured to obtain a text authored by a person. The processing circuitry is configured to analyze the text to obtain measurements of language features of the person, input the measurements of the language features of the person into an evaluation model that is trained to predict a score as a function of the language features, determine a specific score for the person based on the evaluation model and output the specific score of the person for predicting a behavior of the person.

In an embodiment, the processing circuitry is configured to obtain training data via the interface circuitry, analyze the training data to obtain training measurements of the language features from the training data, use the training measurements of the language features as parameters to establish classifiers corresponding to abstract text features by machine learning, and fuse the classifiers into a decision tree to form the evaluation model.

In an example, the processing circuitry is configured to input the training measurements of the language features into a classifier corresponding to an abstract text feature according to mapping relationships between the language features and the abstract text features.

Further, in an example, the processing circuitry is configured to segment the training data according to punctuations, and collect statistics on the segmented training data to obtain statistical features.

In addition, in an example, the processing circuitry is configured to establish a plurality of classifiers corresponding to a same abstract text feature by different machine learning methods, and determine, from the plurality of classifiers, a classifier having a highest accuracy as the classifier corresponding to the abstract text feature.

Aspects of the disclosure provide a method. The method includes obtaining a text authored by a person, analyzing the text to obtain measurements of language features of the person, inputting the measurements of the language features of the person into an evaluation model that is trained to predict a score as a function of the language features, determining a specific score for the person based on the evaluation model, and outputting the specific score of the person for predicting a behavior of the person.

Aspects of the disclosure provide a non-transitory computer-readable medium storing instructions which when executed by a computer causes the computer to perform a method. The method includes obtaining a text authored by a person, analyzing the text to obtain measurements of language features of the person, inputting the measurements of the language features of the person into an evaluation model that is trained to predict a score as a function of the language features, determining a score for the person based on the evaluation model, and outputting the score of the person for predicting a behavior of the person.

BRIEF DESCRIPTION OF THE DRAWINGS

FIG. 4-1 is a schematic diagram of a result of comparison between credit evaluation effects of financial features and text features according to an embodiment of the present disclosure;

FIG. 4-2 is a schematic diagram of a result of comparison between credit evaluation effects of the financial features and the financial plus text features according to this embodiment of the present disclosure;

FIG. 4-3 is a schematic diagram of impacts of different text features on credit evaluation according to this embodiment of the present disclosure;

FIG. 5-1 is a schematic architectural diagram of a credit risk evaluation system based on multiple classifiers according to an embodiment of the present disclosure;

FIG. 5-2 is a diagram of comparison between performances of combinations of different numbers of classifiers according to this embodiment of the present disclosure;

DESCRIPTION OF EMBODIMENTS

Figure 1:
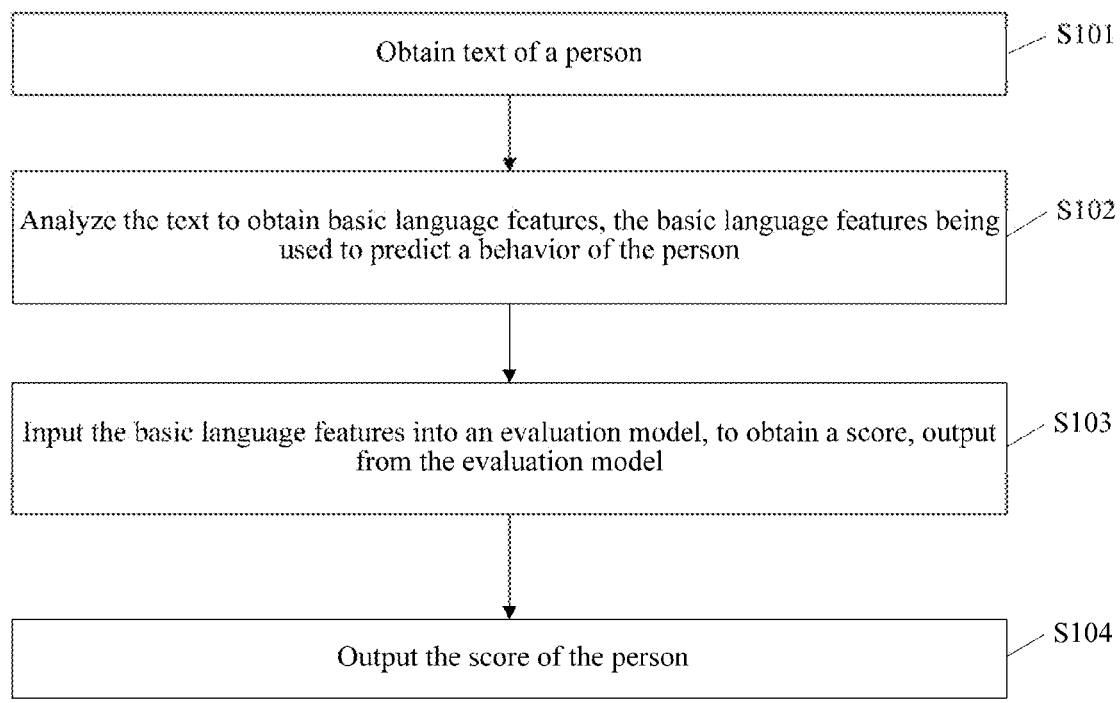
FIG. 1 is a schematic flowchart of implementation of a credit risk evaluation method based on text analysis according to an embodiment of the present disclosure.

The general process of P2P network loan is usually as follows: a P2P network loan company exists as an intermediate display platform for displaying loan information of both parties; investors and borrowers perform online transactions by means of free bidding, so that the company makes corresponding service fees when the transactions succeed. The general process of the P2P network loan may alternatively be described briefly as loan transactions performed in a person-to-person manner, where the borrowers need to repay the principal and also need to pay interest to the lenders when the debit is due, and the lenders need to take the risk that the principal payment is not in place while making profits.

Credit is a production and social relationship of mutual trust between both parties generated among individuals, groups and commodities during transactions, is an inevitable product of economic and social development, and is an indispensable part in market economy. In the P2P network loan, the credit level of both small and medium-sized enterprises and individuals is an important decision basis, upon which investors consider whether to invest in them.

Credit evaluation is also referred to as credit rating. As an important role in the construction of a credit system, the credit evaluation is to get comprehensive understanding of enterprises or individuals according to a particular index and method, and scientifically and objectively make comprehensive evaluation on credit level thereof according to collected information. The main starting point is to investigate the probability of breach of contract of the inspected borrower, to determine whether the borrower can complete the appointed thing on time, and in the P2P loan, the appointed thing is to pay of the loan on time. The credit evaluation is basically a problem of classification in data mining, and in the credit evaluation, a population belonging to the same category is divided into two or more different subsets according to different features. In general, in loan credit evaluation, the borrowers are classified into credible "good" users and "bad" users with a credit risk, that is, positive and negative cases in the classification. The two categories are classified by using historical credit data, to help investors understand the potential risk of the investment of this time.

Credit data: during the process of credit evaluation, various data is used to help qualitative and quantitative analysis or train a model, and such data is referred to as credit data. According to difference of data, the data may be divided into structured data and unstructured data. For example, reviews of social networks, and audios and videos uploaded by users/applications filled in by users are data that exists in data formats such as text, pictures, audios, and videos, and are all unstructured data. Data in the financial field is divided into two categories: hard information and soft information, based on whether the data is easy to be perceived and accepted. The hard information is accurate, logical and traceable information, that is, information that can be directly verified, and the information can be quantified and recorded in the document, and can be accurately transmitted, such as financial statements and wage levels. On the contrary, the soft information is information that is subjectively provided by the information provider and cannot be directly verified by other people.

In embodiments of the present disclosure, 28853 loan records generated by a Prosper platform between Jan. 1, 2006 and Dec. 31, 2008 are used as training data. When the borrower applies for a loan by using the P2P loan platform, the borrower needs to fill in the loan application description. As a category of text information subjectively written by the borrower, the application description, along with financial information of the borrower, is used as training data, so as to research which features thereof affect the credit, and form an effective credit risk evaluation system by adjusting a model trained by the features.

Technical solutions of the present disclosure are further described in detail with reference to the accompanying drawings and specific embodiments.

In the embodiments of the present disclosure, the credit risk of the loan is evaluated by using text features of the borrower. For example, related data (the text description of the borrower) is obtained from a global maximum P2P network loan platform, and then six major abstract text features of the borrower are extracted from the text description of the borrower by using a machine learning method and a statistical method, and next, the six major abstract text features are used to evaluate the repayment will and the repayment ability of the borrower. The six features include subjectivity, deceptiveness, text readability, sentiments, and personality traits and modes of thinking of users.

The credit risk evaluation of the P2P network load is determined by two factors: the repayment will and the repayment ability. As a main factor, the repayment ability is about whether the borrower can perform repayment on time, and the repayment on time depends on the economic state of the borrower. Moreover, the payment will, as a dependent factor, depends on the idea and concept of the borrower.

Embodiment 1

An embodiment of the present disclosure provides a credit risk evaluation method based on text analysis. The method is applied to a computing device. In the process of implementation, the computing device may be an electronic device having information processing capabilities such as a personal computer, a server, an industrial computer, or a notebook computer. Functions implemented by the method can be implemented by a processor in the computing device by invoking program codes. Certainly, the program codes may be stored in a computer storage medium. It can be seen that the computing device includes at least the processor and the storage medium.

FIG. 1 is a schematic flowchart of implementation of a credit risk evaluation method based on text analysis according to Embodiment 1 of the present disclosure. As shown in FIG. 1, the method includes:

Step S101: Obtain text of a person, such as a borrower.

Herein, the text may be any text that is about loan matters and is written by a borrower. For example, an application written by the borrower to a lender of the like may be used as the text of the borrower in this embodiment of the present disclosure.

Step S102: Analyze the text to obtain basic language features, the basic language features being used to predict a behavior of the person, such as whether the borrower breaches a contract.

Herein, in the implementation process, basic language features may be extracted from the text by using a natural language processing related method. The natural language processing related method, such as a topic model method, is a method and a theory for performing processing, such as identification, transmission, storage, and understanding from different granularities such as words, sentences, paragraphs, and documents by using an automatic machine as a tool by using a computable method. The method can perform processing such as word segmentation, part of speech tagging, structural analysis, even meaning understanding on text, so as to obtain, from different aspect, more features that can indicate text.

Herein, the basic language features include at least statistical features, part of speech features, sentiment features, physical features, and tense features of text; the statistical features include sentence features, word features and punctuation features; the sentence features include at least: a total number of sentences, an average sentence length, a maximum sentence length, and a ratio of a number of interrogative sentences; the word features include at least: an average word length, a category and a number of longest words, a total number of words, an average number of times of occurrence of words, and a maximum number of times of occurrence of words; and the punctuation features include at least: a ratio of a number of question marks and a ratio of a number of exclamation marks.

Step S103: Input the basic language features into an evaluation model, such as a preset credit risk evaluation model, to obtain a score, such as a credit risk value, output from the credit risk evaluation model, of the borrower.

Herein, the credit risk evaluation model is pre-established, and the process of establishing the credit risk evaluation model is described below. In this embodiment of the present disclosure, the credit risk evaluation model may be one simple classifier, or may be a credit risk evaluation system formed by multiple classifiers. One classifier may be considered as an expert system in a field or aspect, and the credit risk evaluation system formed by multiple classifiers may be considered as a mixed expert system.

Step S104: Output the score of the person, such as the credit risk value of the borrower.

In this embodiment of the present disclosure, the method further includes: establishing the credit risk evaluation model.

To establish the credit risk evaluation model, the method includes a step of obtaining training data.

Herein, the training data is text about a loan of the borrower.

The method further includes a step of analyzing the training data to obtain basic language features of the training data, that is similar to the foregoing step S102, and description will be made in the following embodiment.

The method further includes steps of using the basic language features as a parameter, and establishing classifiers corresponding to different abstract text features by using a machine learning method.

Herein, the abstract text features include deceptiveness, subjectivity, sentiments, text readability, personality traits, and modes of thinking. The machine learning method may be: an artificial neural network method, a support vector machine method, a decision tree method, a Bayesian method, a random forest method, or a logistic regression method. In the process of implementation, classifiers corresponding to a same abstract text feature may further be established by using different machine learning methods. By using that the deceptiveness is used as the abstract text feature as an example, a classifier of the artificial neural network method, a classifier of the Bayesian method, and a classifier of the random forest method may be established, and then a classifier having a highest accuracy is used as a classifier corresponding to the abstract text feature.

Herein, the step of using the basic language features as a parameter includes: inputting the basic language features into the classifier corresponding to each of the abstract text features according to relationships between the basic language features and the abstract text features. Herein, refer to FIG. 2 for the relationships. The subjectivity corresponds to the part of speech features and the sentiment features. The deceptiveness corresponds to the part of speech features, the sentiment features, the physical features, and the tense features. The readability corresponds to the statistical features. The sentiments correspond to the sentiment features. The personality traits correspond to the statistical features, the part of speech features, the sentiment features, the physical features, and the tense features. The modes of thinking correspond to the part of speech features and the physical features.

In addition, in an example, the method includes steps of using the classifiers as basic classifiers, and performing decision fusion by using a decision tree algorithm to form the credit risk evaluation model.

Herein, the classifiers corresponding to the abstract text features are used as basic classifiers, and decision fusion is performed by using a decision tree algorithm to form the credit risk evaluation model.

In this embodiment of the present disclosure, the step of establishing the credit risk evaluation model further includes: segmenting the training data according to punctuations, and collecting statistics on the segmented training data to obtain statistical features.

Herein, the punctuations include a full stop, a question mark, and an exclamation mark.

This embodiment of the present disclosure provides a credit risk evaluation method based on text analysis. The method includes: obtaining text of a borrower; analyzing the text to obtain basic language features, the basic language features being used to predict whether the borrower breaches a contract; inputting the basic language features into a preset credit risk evaluation model, to obtain a credit risk value, output from the credit risk evaluation model, of the borrower; and outputting the credit risk value of the borrower. In this way, the credit risk of the borrower can be effectively evaluated, so as to provide important decision basis for an investor during investment.

Embodiment 2

Figure 2:
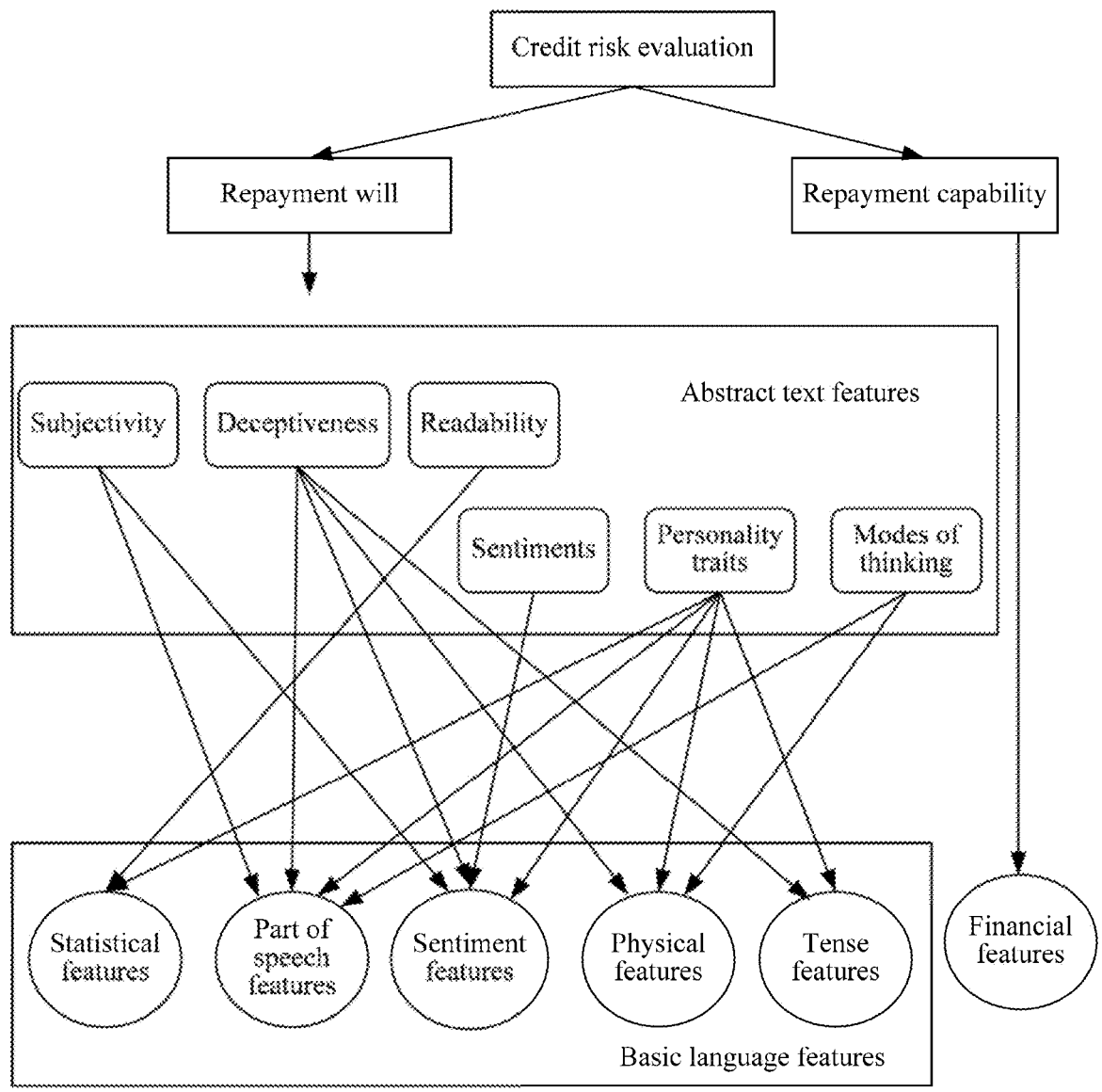
FIG. 2 is a schematic diagram of relationships between abstract text features and basic language features according to an embodiment of the present disclosure.

This embodiment introduces the abstract text features and the basic language features in Embodiment 1. FIG. 2 is a schematic diagram of relationships between the abstract text features and the basic language features according to this embodiment of the present disclosure. As shown in FIG. 2, to mine useful information from text information of a borrower, first, various abstract text features are identified from the text information. The abstract text features are used to describe various aspects of the borrower, and then the basic language features are constructed and combined according to the abstract text features.

2.1 Abstract Text Features

The abstract text features are six major abstract text features that are identified, according to knowledge such as psychology and linguistics, from the text description and are used for credit risk evaluation. The six major abstract text features include deceptiveness, subjectivity, sentiments, text readability, personality traits, and modes of thinking.

1) Deceptiveness

The deceptiveness is used to identify cheaters and honest people. In this embodiment, the deceptiveness is defined from four dimensions, which are respectively, cognitive load, internal imagination, decomposability, and negative sentiments. The cheaters not only fake facts that do not exist, but also need to prevent themselves from being disclosed, and therefore they usually have to spend more cognitive resources and produce relatively high cognitive load to illustrate simple stories. The magnitude of the cognitive load is usually measured by using concreteness and cohesiveness. The concreteness can be obtained by a Coh-Metrix program from an MRC Psycholinguistic Database, and the cohesiveness is usually closely related to the number of conjunctions. Researches have proven that the description text with deceptiveness has high concreteness and low cohesiveness.

The internal imagination is related to the use of physical words and tense words. In general, the event description from practical experience contains more information, such as time (such as "today", "yesterday" and "this month") and a location (such as "here", "there" and "street"), and the information is not the internal imagination.

The decomposability is related to the use of personal pronouns. To decompose a false story, a cheater uses more third-person words (like "she" and "he") to describe the story.

The negative sentiments are related to the use of mood words, because the increase in guilt leads to lying, and cheaters use more negative words than honest people.

2) Subjectivity

The subjectivity is a category of text mining, is used to evaluate the subjective or objective condition or tendency of text, and it is about whether the text has more information of the objective world or more personal feelings. Researches have proven that text containing more objective information is more likely to have arrears. After lenders provide a series of objective information about a loan condition, borrowers with high credit are more focused on explaining the use of the loan in the text description, and therefore the text description involves more subjective information, and borrowers with the risk of breach of contract are not willing to be more involved in unpleasant facts, and use a large amount of objective information during description. Therefore, the subjectivity is closely related to sentiment features, such as the subjectivity of words as well as physical features that reflect thoughts and opinions of people, the use of modal verbs, the use condition of numerals, adjectives and adverbs, and the like.

3) Sentiments

The sentiments are obtained by performing a directional grasp on the sentiment direction of the text description of a borrower. By processing text, it is determined whether the borrower is positive or negative, friendly or not, so as to learn viewpoints, sentiments, and attitudes of the borrower from deep depth. By performing portfolio analysis on the basic features of sentiments, a more comprehensive and stereoscopic understanding on the aspect of sentiments is formed. A more positive and optimistic attitude of a borrower towards life indicates higher credit, and vice versa.

4) Personality Traits

The basic difference between people is their respective personality traits, including behaviors, temperaments, sentiments, and inner spirit. The cultivation of personality traits is a long-term and stable process that affects many different aspects of individual behaviors. For example, those who have a personality of being willing to share and being positive are less likely to breach a contract than those who are mean and pessimistic. A more important difference in personality is more likely reflected in a single word, and in text, linguistic features also truly reflect the personality traits of individuals.

Personality traits can be defined from five dimensions, known as Big Five. The first is extroversion. Outgoing people are more willing to communicate with others, tend to use short sentences with fewer categories of words, and use more verbs, pronouns, adverbs, interjections, and the like in text, and sentiments of the text are usually positive and optimistic, and the text contains more social words, and the like. Among a large number of factors that affect personality traits of introversion and extroversion, the most important dimension can be selected by means of a formality measurement manner to perform calculation:

$$F=(\text{noun freq}+\text{adjective freq}-\text{preposition freq}+\text{article freq}-\text{pronoun freq}-\text{verb freq}-\text{adverb freq}-\text{interjection freq}+100)/2$$

It is found by researches that each dimension has a tiny but important link with linguistic features. Neurotic groups prefer to use more first person singulars for expression, and their text contains more negative words and fewer positive words. On the contrary, people having stable moods use more positive words and use articles more frequently. Rigorous people try to avoid using negation words, negative words and modal verbs. More long words and uncertain words can be found in the text of open people, and they are less accustomed to using the first person singular and the past tense for expression. Finally, agreeableness describes the aspect about whether people are easy to get along with. People with more swearing words, negative words, and angry words are usually more difficult to get along with.

In view of this, personality traits are closely related to linguistic features. They are not only related to intrinsic features of the words (such as the word length and the word category), but also can be reflected in aspects such as the sentiment tendency (positive and negative), part of speech (adjectives and verbs), tenses (third person, past tense) and specific meanings of the words (social words).

5) Modes of thinking

In text information, in addition to the content words contained in the text information, that is, words having explicit meanings for expressing the idea of the text, there are a large number of functional words in the text information. The functional words reflect the communication manner of the author rather than the described actual content, and are more consistent with the social environment where the author is located and the real psychological world of the author. With the development of things and changes of cognition of the author, the used functional words also correspondingly change.

First, perceived complexity describes the richness during argumentation, that is, the degree of difference between conflicting schemes and the integration between different solutions, and is usually expressed by using exclusive words and conjunctions. People who like to tell true stories are more likely to use exclusive words. When describing complex and specific information, most people increase the use of prepositions, perceptive words, and long words. Two perceptive mechanisms: causal vocabulary and opinion vocabulary usually appear in descriptions of past events and can reflect deliberation on what has already happened. If a person is uncertain about what is being described, the person prefers to use uncertain words and supplementary words for buffering. Excessive use of uncertain words indicates the authenticity of the story. Therefore, the modes of thinking are related to the part of speech and perceptive physical words that describe causes and opinions, and the modes of thinking of the author can be combined and abstracted from the two basic features, to more vividly reflect the real intention of the author when the author writes the description text.

6) Text Readability

The text readability is a relatively conventional index for measuring text, reflects the level of education, the social position, and the like of the author, and has been used in fields such as commodity feedbacks, purchase intentions, and social media information reviews. The writing manner of the text affects the degree of difficulty of readers in understanding the text. The readability of text is measured from three dimensions, which are respectively vocabulary categories, vocabulary readability, and vocabulary complexity.

First, the vocabulary categories are used. If fewer vocabulary categories are used in text, the text is easier to read. Formula (1) is usually used, and is a measurement formula that is for vocabulary richness and that is not dependent on the text length:

$$D = \sum_{i=1}^{V(N)} V(i, N) \frac{i}{N} \frac{i-1}{N-1}. \quad (1)$$

In formula (1), N is the length of the text; V(i, N) represents that a vocabulary category occurs for i times. The vocabulary readability and the vocabulary complexity are also closely related to the sentence lengths, the vocabulary lengths, and the vocabulary categories of the text.

Researches have proven that higher readability of the text indicates a higher probability of breach of contract of a loan corresponding to the text. If a person has received good education and has stable high income, the loan description written by the person is clearer and more readable, and the corresponding credit is also better.

2.2 Basic Language Features

Abstract text features can reflect the intention of breach of contract and credit habits of the author from the perspective of the actual abstract sense, but there is no way to directly extract them from text features. Therefore, according to the significance of the abstract text features as well as text feature factors affecting the abstract text features, text features are summarized into 5 basic language features by statistics collection, and the features can be directly obtained from text by using machine learning methods and statistical methods, so that the features are used to indicate the abstract text features, and finally obtain an internal relationship between the abstract text features and the repayment will as a feature for predicting whether a breach of contract occurs.

1) Statistical Features

Intuitively, the part, which can be most easily extracted from text, of text features can be directly obtained by statistics collection, for example, the number of sentences, the number of words, and the word lengths in the text. The features are easy to calculate by statistics collection, and can reflect the writing attitude and even the life attitude of the author from different degrees. For example, the sentence lengths can reflect the readability of the text to some extent. Long sentences in the text indicate lower readability and more obscure meanings expressed in the text. In addition, for a same statistical object, for example, the word number and the word category also represent different meanings. The word number indicates the length of the text, and the word category indicates the vocabulary used in the text, and reflects the variety of used words.

There are many ways to extract the features. A statistical method is used in this embodiment of the present disclosure and the method has features of being simple and easy to implement. First, if statistics need to be collected on features about sentences in the text, the text needs to be broken up into sentences. Segmentation and identification are performed according to common punctuations in English, such as a full stop, a question mark, and an exclamation mark, and attention is focused on processing the problem of quotes and braces. Second, word segmentation is performed on each sentence to collect statistics on features about words. Currently, 17 simple statistical features are extracted. The two feature granularities respectively represent sentence features and word features. The meaning of each feature is listed in Table 2-1.

TABLE 2-1

Simple statistical features of text
Simple statistical features (17)

| Feature granularities | Extracted features |
|---|---|
| Sentence features | Total number of sentences, average sentence length, maximum sentence length, and ratio of a number of interrogative sentences |
| Word features | Average word length, category and a number of longest words, total number of words, average number of times of occurrence of words, and maximum number of times of occurrence of words |
| Punctuation features | Ratio of a number of question marks and ratio of a number of exclamation marks |

2) Part of Speech Features

In this embodiment of the present disclosure, a maximum entropy model is used for performing part of speech tagging on words, that is, allocating a part of speech category to each word, such as an adverb or a conjunction. The key problem of the maximum entropy model lies in feature selection, and the selected features directly affect the accuracy of tagging. In the text, the parts of speech of words at adjacent positions affect each other, and the part of speech is also related to the suffix of the word itself and the adjacent words. Therefore, the maximum entropy feature template is formed by comprehensively selecting the contextual features of the words in the text and the features of the words themselves, as shown in Table 2-2:

TABLE 2-2

Maximum entropy model training feature template

| Feature number | Feature category | Feature template |
|---|---|---|
| 1 | General | wi = X & ti = T |
| 2 | General | ti − 1 = T1 & ti = T |
| 3 | General | ti − 1 = T1 & ti − 2 = T2 & ti = T |
| 4 | General | wi + 1 = X1 & ti = T |
| 5 | Rare | Suffix S of wi, [S] < 5 & ti = T |
| 6 | Rare | Prefix P of wi, 1 < [P] < 5 & ti = T |
| 7 | Rare | wi contains number & ti = T |
| 8 | Rare | wi contains capital letter & ti = T |
| 9 | Rare | wi contains hyphen & ti = T | wi, wi+1, ti, ti−1, and ti−2 respectively represent a current word, a previous word, a part of speech of the current word, a part of speech of the previous word, and a part of speech of a word previous to the previous word. The General feature applies to each word, and in an example when the word matches the template that describes the rare feature category, the rare feature is added.

The maximum entropy model training corpus is derived from Penn Treebank and refers to a part of speech tagging result label provided by Penn Treebank. In this embodiment, the main object of the used part of speech features is the word level and therefore there are totally 36 categories of obtained part of speech features of the word level. The obtained classification of parts of speech is excessively detailed. For example, singular and plural nouns belong to different categories, and comparative degrees of adjectives and adjectives also belong to two different categories and so on. Therefore, the categories of the parts of speech are summarized into 12 main categories of parts of speech, and the number and specific categories included in each category are calculated, as shown in Table 2-3 and Table 2-4.

TABLE 2-3

Text part of speech features formed by combination
Part of speech features

| Extracted features | Summarized specific features included |
|---|---|
| Nouns | Singular nouns (NN), plural nouns (NNS) Singular proper nouns (NNP), plural proper nouns (NNS) |
| Adjectives | Adjectives (JJ), comparative degrees of adjectives (JJR), superlative degrees of adjectives (JJS) |
| Verbs | Original forms (VB), gerunds (VBG), present tenses of non-third person words (VBP) |
| Extracted features | Past participles (VBN) |
| Determiners | Determiners (DT), predeterminers (PDT) |
| Conjunctions | Coordinating conjunctions (CC), subordinating conjunctions (IN) |
| Prepositions | Personal pronouns (PRP), PRPS, (possessive pronouns) |
| Verbs | Adverb (PB), comparative degrees (RBR), superlative degrees (RBS) |

TABLE 2-4

Text part of speech features without combination
Part of speech features (5 part of speech features are directly used)

| Numerals | Existential words | Prepositions | Modal verbs | Interjections |

3) Sentiment Features

In addition to features and part of speech features, which are obtained by intuitively collecting statistics on text itself, because the final objective is to investigate the effect of text on credit evaluation, that is, whether there is a risk that the writer breaches a contract, features about sentiment tendencies of the writer also need to be extracted. These characteristics directly reflect the writer's attitude toward life and values, and can also reflect the risk of breach of contract to a great extent. Considering that training of sentiments such as positive/negative sentiments by using machine learning methods needs a large number of taggings and training costs, and professional understanding and mastering of the knowledge about part of speech classification of language are needed during tagging, in this embodiment of the present disclosure, sentiment features are extracted by using a sentiment dictionary method. A General Inquirer classification dictionary is selected, and the number and categories of sentimental polarity words are counted according to correspondence between corresponding words and experimental text words under different categories in the classification dictionary. Classification information in the General Inquirer dictionary is derived from four aspects such as the Harvard IV-4 dictionary and the Lasswell value dictionary, 156 in total. Finally, according to whether the features are related to the attitude and concept of the writer, 15 features are selected, as shown in Table 2-5.

TABLE 2-5

Text sentiment features
Sentiment features (15)

| Positive | Negative | Positive comments | Negative comments | Certain | Uncertain |
|---|---|---|---|---|---|
| Strong Pleasure | Weak Pain | Active Not | Passive | Hostile | Degree |

4) Physical Features

The physical features usually have some practical meanings, such as time, space, and causal goals. Researches have shown that the description text of real events contains more spatial and time information than the event description that is fabricated at will by using imagination. When whether a breach of contract is made is determined, the difference between real text and fabricated text can be distinguished by determining whether physical information is included. Similarly, the General Inquirer classification dictionary is used to count the number and categories of physical words according to the correspondence between corresponding words and experimental text words under different categories in the classification dictionary. Finally, 9 physical features are obtained, as shown in Table 2-6:

TABLE 2-6

Text physical features
Physical features (9)

| Sense | Insight | Virtue | Vice | Social | Goal |
|---|---|---|---|---|---|
| Causal | Time | Space | | | |

5) Tense Features

The tense features are extracted from two aspects. Because the Penn Treebank tagging corpus also tags tense attributes such as the past tense, the present tense and the future tense of verbs, the maximum entropy model can be used to train texts to obtain tense features. On the other aspect, a dictionary of commonly used phrases indicating time such as the past, the present, and the further is looked up for words corresponding thereto in the sentence to determine time when the event described in the sentence occurs. Finally, the tense features of the sentence are obtained in combination with verbs and time adverbials of the sentence.

Embodiment 3

This embodiment of the present disclosure introduces the natural language processing method and the machine learning method in Embodiment 1.

3.1. Natural Language Processing Method

In the P2P platform loan process, text information such as loan reason description submitted by the borrower has an impact of credit evaluation. The user text information is usually formed of natural language, that is, the daily spoken or written language used by people. The natural language is obviously different from the computer language and numbers. The natural language neither can be directly indicated and understood by a computer, nor can be directly used for calculation. However, the natural language is formed by multiple elements such as grammar, words, and sentences, and therefore includes a large amount of information, and can reflect the personality, sentiments and other complex moods of a person. Therefore, text needs to be processed and analyzed by using a simple statistical method or a natural language processing method. Features that can represent information of one dimension thereof and that can be quantitatively indicated are extracted from the text, so that the computer can perform calculation by using the features, and then perform next processing.

During text processing, in addition to simply counting words, sentences, and the like, the natural language processing method is used more and more widely. The natural language processing method is a method and a theory for performing processing, such identification, transmission, storage, and understanding from different granularities such as words, sentences, paragraphs, and documents by using an automatic machine as a tool by using a computable method. The method can perform processing such as word segmentation, part of speech tagging, structural analysis, even meaning understanding on text, so as to obtain, from different aspect, more features that can indicate text.

1) Part of Speech Tagging

Part of speech, also referred to as word class, refers to the basic grammatical attribute of a word, and is usually divided according to the form, the function and grammatical meaning of the word. The part of speech tagging is to tag a word of some language with a word class to which the word belongs, and is one of basic and import work in the natural language processing method. The methods are usually divided into a rule-based method and a statistics collection based method. The rule-based part of speech tagging is to tag each word in a sentence with all possible word class tags by looking up a dictionary, and then gradually delete wrong tags by applying a rule, and finally obtain a correct result. An example of part of speech tagging is as follows:

Example sentence: The lead paint is unsafe.

Tagging result: The/Det lead/N paint/N is/V unsafe/Adj.

An entropy describes the uncertainty of a value of a variable. A value of the entropy is positively related to the uncertainty. A larger value indicates more uniform distribution of the random variable. In the absence of all the information of the distribution, according to the maximum entropy principle, distribution when the value is maximum under the existing distribution premise is selected, that is, uniform distribution. According to the maximum entropy principle, statistical modeling is the best choice that can be made when the distribution is unknown, because the choice of any non maximum entropy principle represents subjective addition of non-distribution information.

The maximum entropy principle was proposed by E. T. Jaynes in 1957 and has been widely used in many fields. The maximum entropy method represents the known knowledge in the sample data by means of a feature, and by adding other conditions, keeps the model expectation of the feature consistent with the observation expectation, thus becoming the extreme value problem. When the maximum entropy model is constructed, the focus is on selecting which useful features can be selected without considering how to use the features. The maximum entropy method is usually stated as follows:

sample data O exists, $O=\{(m_1,n_1),(m_2,m_2), \ldots ,(m_i,m_i)\}$, where $m_i \in M$, $n_i \in N$, solve model distribution, $P(m,n)$, so that the distribution satisfies the following two conditions:

(1) $P(m,n)$ can make the entropy maximum, that is, $p^*=\mathrm{argmax}H(p)$; and (2) $P(m,n)_{(2)}$ $p(m,n)$ is subject to known statistical data in the sample data.

Solving the maximum entropy model is equivalent to solving the following constraint optimization problem:

$$p^*=\mathrm{argmax}H(p)$$

$$E_p f_j = E_{\tilde{p}} f_j \text{ where, } 1 \le j \le k$$

$$\Sigma_{x,y} p(x,y)=1$$

Two sides of the equation are respectively the maximum entropy models of the model expectation and the observation expectation, and have no requirement for the correlation of features, and the overfitting problem does not exist. By means of overall consideration of the simplicity of implementation and the classification effects, in this embodiment, part of speech tagging is performed on text by using a maximum entropy model.

2) Sentiments

Content of text written by people when the people make reviews, write articles, and submit applications includes a large number of emotional colorings and tendencies of the authors, and can reflect, to some extent, the personality traits and life attitudes of the authors, such as positive or negative sentiments, or recognition or denial. Briefly, sentiments are emotional tendencies that are hidden in and determined from literal unstructured data of people.

As a type of unstructured data, it is difficult to automatically understand and process text. Therefore, during sentiment mining, sentences and words, paragraphs, documents, and the like are usually separately extracted to perform analysis from different layers to convert text into structured data. According to the mined content, opinion extraction, opinion mining, sentiment mining, and subjective analysis may further be performed. This embodiment mainly focuses on mining sentiment tendencies in the text, extracting sentiment words therein, and determining the sentiment attitude of the author of the text.

During sentiment classification, on one hand, relatively popular, mature, and open sentiment dictionary resources may be used. The sentiment dictionary resources usually divide words into different sentiment categories according to different bases such as part of speech or emotional coloring, so as to label each word from different perspectives for overall description, and can also reflect laws of sentiment words of different categories. On the other hand, the classification problem can be processed by using a classification algorithm in machine learning, so as to obtain the attitude tendency of the text.

3.2 Machine Learning

Literally, machine learning is understood as making a machine understand and learn like a person, so that the machine can be inspired from a data set, and highlight the real meaning behind the data. The content researched in this embodiment is the effect of text on credit evaluation. The credit level of the borrower needs to be determined from a feature set mined in the text, and it is difficult to intuitively obtain the needed information from the original text data, or even the feature set. Therefore, the disordered data needs to be processed by using a machine learning algorithm to convert the data into quantitative features that can be identified and processed by a computer. By constructing a model, text represented by using the features is as input data, so as to obtain a category to which the credit level of the borrower most probably belongs. The main task of machine learning is classification and regression, which coincides with the task of this embodiment. The classification is to determine, according to feature information, a category to which an instance belongs. Regression is to form an optimal fitting curve by using given data points. They both belong to supervised learning, and need to know what to predict, that is, the classification of the target variable, and the data is usually divided into training sets and test sets.

Embodiment 4

Whether the language features of text information submitted by a borrower of a P2P platform can improve the accuracy of credit evaluation and whether the language features can be used to predict available values are important content of researches. The text includes abundant information about the writer. In addition to semantic content, the writing manner and the writing habit can also reflect the personality traits, and even the credit level of the writer. However, in general, grammars, semantics and sentiment tendencies included in the text cannot be directly represented and processed by a computer, and therefore the features need to be identified and quantified, so as to be used in text analysis.

To have a comprehensive understanding of the language features of the loan text, two steps of explanation and prediction supplementing each other are provided. On one hand, by means of the summary of related linguistic and psychological literature and application of econometrics models, effects of different language information in predicting potential risks are researched, and suitable features are selected for prediction. On the other hand, the language features are used to perform credit evaluation by using several common machine learning methods, and results are analyzed to mine and disclose the predict capabilities of the language information.

Based on the foregoing introduction about the abstract text features and the basic language features, this embodiment of the present disclosure introduces the following experimental process and experimental results.

4.1 Experimental Process

Financial related features are divided into two types. One type is basic financial features, which are financial related information that needs to be filled by a user during registration and loan application. The other type is credit features, and in an example, the credit features need to be obtained according to historical credit loan records of the user or purchased from a dedicated mechanism. Experimental data is processed to obtain financial feature data and the aforementioned text feature data. The financial features are used as the reference standard, and experiments are made on the text feature data and the basic financial features and on data obtained after the text features are combined with the financial features. The effects of credit evaluation models are observed to research the effect of the text features on credit evaluation. In this embodiment, five basic classification learning algorithms of machine learning are used, which are respectively decision tree, Naive Bayes, logistic regression, neural network and random forest. The classification effects of using text features in credit evaluation are explored by using different machine learning models.

1) Experimental data, referring to data description for experimental data in this embodiment 2) Data preprocessing and normalization Because the extracted text cannot be directly used, the text needs to be preprocessed first. Listing data downloaded from a database cannot be directly used. The data is not in a pure text format, and needs to be extracted from an xml format. Other two pieces of text also include xml labels, and therefore before the features are extracted, content that is not related to text, such as labels is filtered out.

Value ranges of entries in the loan record are greatly different from each other. For example, a loan to income ratio is in a range of 0 to 1; the amount of the loan is more than several thousands; and the number of collected parts of speech, vocabulary features, or the like is also in a range of less than ten to several hundreds. An excessive large difference between the feature values easily causes weight imbalance. Therefore, after features are extracted, all the types of feature data are converted into a same range, that is, normalization. This experiment uses a simple maximum and minimum processing method, that is, deviation normalization, to perform linear transformation on original data, so that result values are all mapped to a range of 0 to 1. The transformation function is as follows:

$$x^* = \frac{x - \min}{\max - \min}$$

max represents maximum, min represents minimum, and X is actual data that needs to be calculated.

3) Feature Selection

When an excessive number of features are input when a machine learning model is trained, not only too much time is spent for model training, but also the decrease in classification effects usually occurs instead. This is due to that irrelevant features may exist among the input large number of features, or a dependency relationship may exist among the features, that is, the so-called noise introduction. When the introduced noise is greater than the improvement effect brought by feature addition, the accuracy of the classification results decreases instead.

Figure 3:
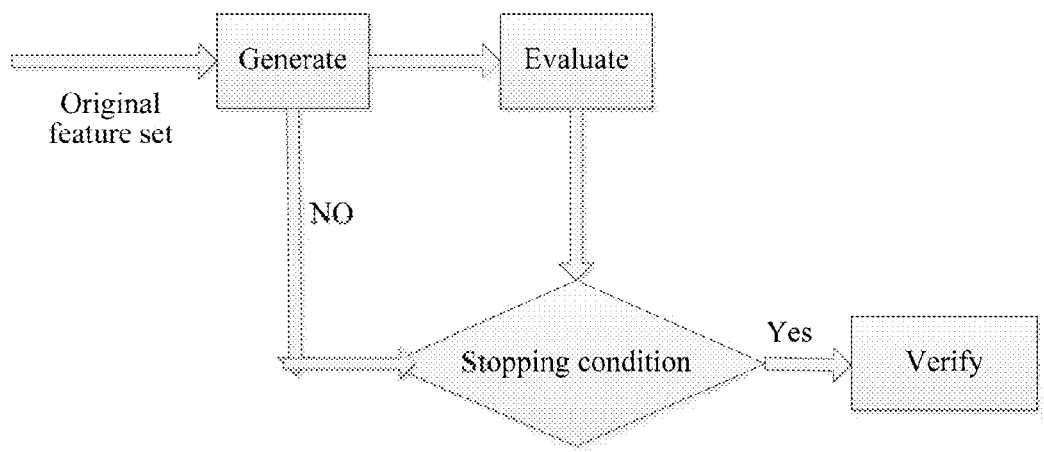
FIG. 3 is a common schematic flowchart that describes feature selection according to an embodiment of the present disclosure.

Feature selection is provided to solve such problems, and refers to deleting irrelevant features or redundant features from currently extracted M feature sets, and keeping a feature subset that helps classification, to reduce the dimension of a data set. FIG. 3 is a general schematic flowchart that describes feature selection according to this embodiment of the present disclosure. As shown in FIG. 3, an initial subset needs to be set first. Secondly, a feature subset is determined by using a search algorithm. This experiment mainly uses a best-first search method of a full search type.

The number of feature subsets starts from 1. An exhaustive attack method is used to calculate the subset classification effect after a new feature is added each time, and then the classification effect of the subset is determined by using an evaluation function. This experiment uses an evaluation method of an encapsulator, and different feature subsets are selected according to different classifiers, that is, a classification attempt is made on the sample; the error rate of the classifier is used as a measurement index, and therefore the classification effect is relatively good.

4) Model Training

To train data by using machine learning algorithms and perform prediction by using models, the following steps usually need to be conformed to. 1) Input data preparation. Input data preparation is also the text feature and loan feature extraction mentioned above. Certainly, the training data also needs to include categorized target variables. 2) Algorithm training. The machine learning algorithms start to involve real learning from this step. Formatted data obtained after processing is input into the algorithms, and knowledge or information is extracted therefrom to form models that can be used for prediction, that is, corresponding model parameters are obtained. 3) Algorithm testing. Before the models are used, the working effects of the algorithms need to be tested. The machine learning algorithms used in this embodiment all belong to supervised learning. Evaluation is performed by means of a known relationship that is between a target variable value and a predicted value and that is used for evaluation. If the output result is unsatisfactory, the models are then corrected for testing.

This embodiment uses five common machine learning classifiers. 1) Decision tree classifier: by using a measurement manner of an information gain ratio, features with highest information gain ratios are selected to divide data each time. The confidence factor is set as 0.005 to tailor the decision tree. 2) Logistic regression classifier: an optimal regression coefficient is determined by using a Sigmoid function and by using a stochastic gradient ascent method. 3) Neural network classifier: this experiment uses a back-propagation neural network, and the activation function is a Sigmoid function. 4) Random forest classifier: 100 trees are used as composition of the classifier. 5) Naive Bayesian Classifier.

5) Cross Validation

After the machine learning models are trained, the accuracy of the models further needs to be verified. In the experiment of this embodiment, the five-fold cross validation is used. Cross validation is a practical method for cutting a data sample into relatively small subsets when the data volume is not big enough. First, a subset therein is used as a training sample to train a classifier, and other subsets are used as test sets to verify indexes such as accuracy of the classifier. The five-fold cross validation is to divide the data set into five parts, and one part is selected each time as a test set, and the remaining four parts are used as training sets, and therefore five experiments are made. Accuracies obtained by the experiments are averaged into an estimated value for the algorithm accuracy.

6) Evaluation Indexes

In this embodiment, the impact of text on credit evaluation is mainly evaluated by using accuracy. The accuracy represents a percentage of the number of results that belong to both the results obtained by classification by using algorithms in this embodiment and the results of the original breach of contract record to the total experimental data amount on the test data, in which there is a repayment breach of contract record.

4.2 Experimental Results

After the text features extracted in the experiment and the experimental process are introduced above, multiple experiments and corresponding experimental results are introduced below from different aspects, and the final experimental results are compared and analyzed.

1) Impact of Text Features on the Effect of Credit Evaluation Classification

To research the impact of text features on the effect of credit evaluation classification, in this embodiment, financial feature data, text feature data, and data obtained by combining the financial features with the text features are respectively used as input data to train models and perform tests, and the financial feature data is used as a control variable for reference. The aforementioned five classifiers are used to calculate the accuracy of evaluation performed by the classifier models on credit risks. Because feature addition causes the noise problem, considering that an excessive number of features causes feature overload, and consequently leads to the problem that the classification effect is reduced, feature selection is performed on feature data before model training is performed. Then comparison is performed with the result of the financial feature classification. The final prediction results of three categories of feature data on five classifier models are shown in Table FIG. 5-2.

First, the classification result predicted by separately using text features is compared with the classification result predicted by separately using financial features. It is found from data that for most classifier models, although the accuracy of prediction by using text features is lower than the accuracy of prediction by using financial features, the values are close to each other and the difference is not large. Particularly, after feature selection, the accuracy of prediction by using random forest is 67.42%, and is higher than the accuracy of the prediction by using financial features by approximately 0.1%; the result of prediction by using neural network is 67.83%, and the difference with the result 68.37% of prediction by using financial features is within 0.5%. On the other hand the results of predictions by using financial and text features are both higher than the result of the prediction by separately using financial features to different extents.

In the current P2P network loan, neither some credit ratings related to the borrower nor objective quantitative data related to loans such as historical data and asset data is completely disclosed, and even some data needs to be purchased to be obtained. On the other hand, the existing personal credit evaluation system has not been perfect, and many borrowers do not have enough financial feature data for credit evaluation. Therefore, the acquisition of financial features has the problems of high existence costs and few sources. Compared with the financial features, the acquisition of text features is much easier. When the borrower applies for loans, the application description for the loan is used as the object of research, and text features are extracted, so that credit evaluation is performed on the borrower. When costs are relatively low and the text features are easy to obtain, the text feature can replace the financial features for credit risk evaluation, and the evaluation effect with a difference that is not big and that is within the acceptable range can be obtained. The condition of comparison between classification result data may be intuitively shown in FIG. 4-1.

Figures 1, 4:
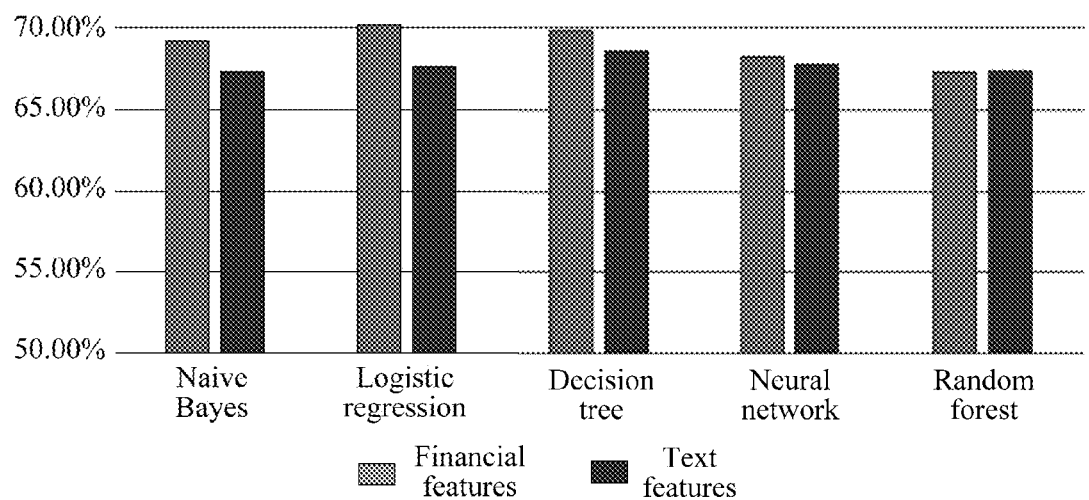
Figures 2, 4:
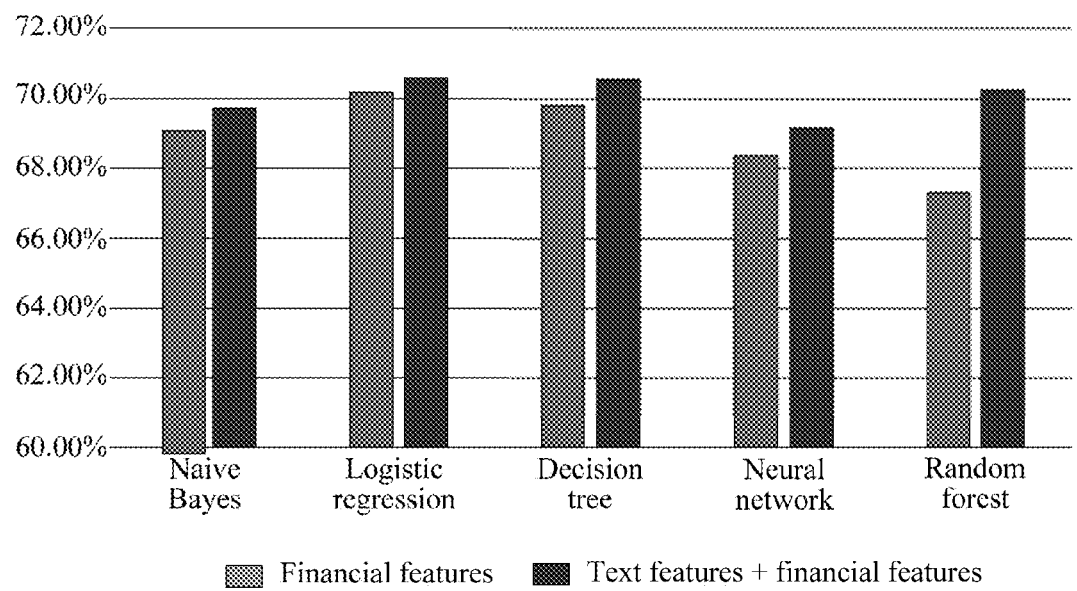
Figures 3, 4:
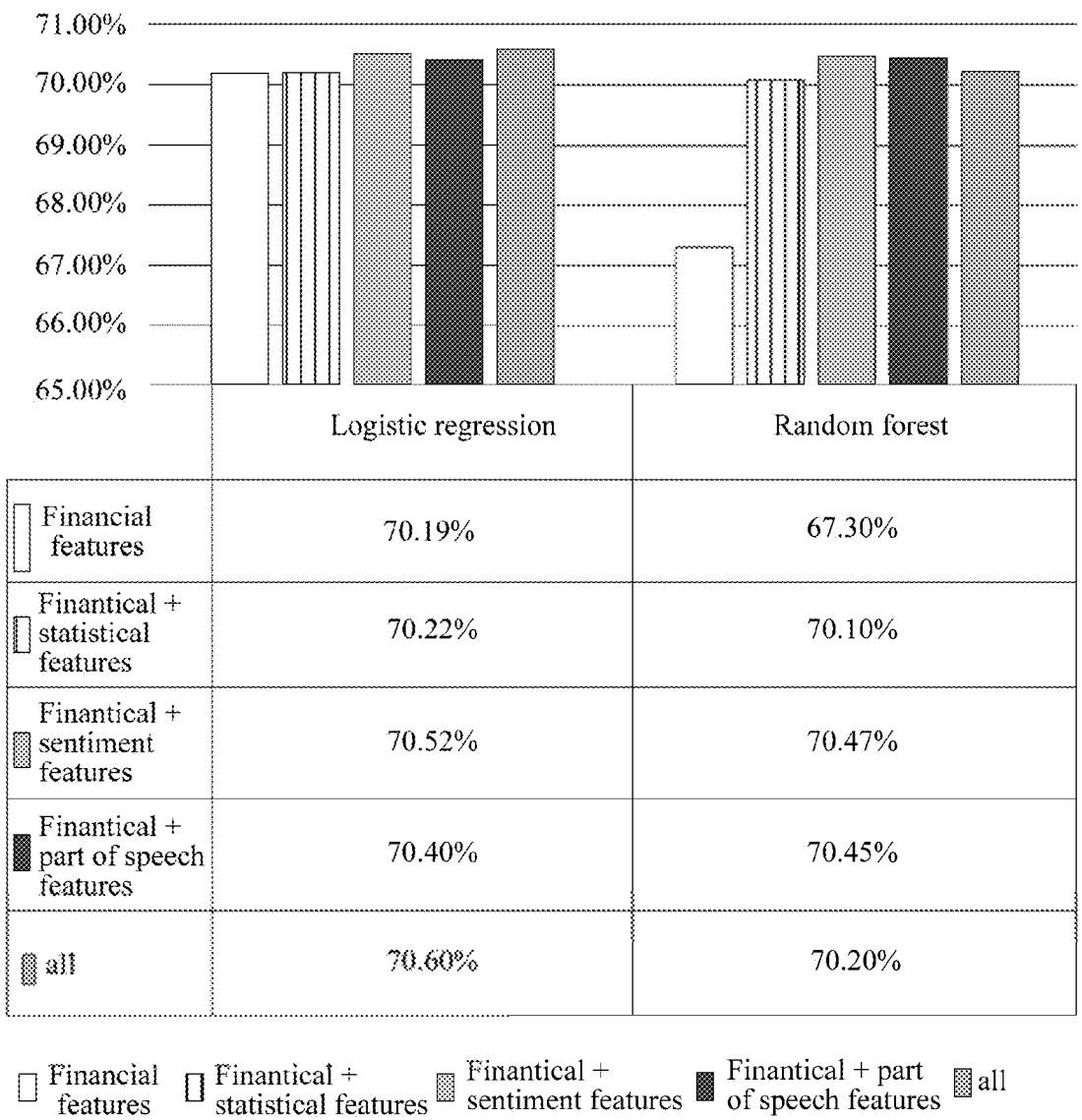

In addition, comparison is performed between the result of classification by using financial features, into which text features are added, and the result of classification by using the financial features, as shown in FIG. 4-2. It is not difficult to find that, in all the five classifier models, the accuracy of classification by using financial features, into which text features are added is improved to different extents. That is, in this embodiment, not only the extracted text features can be used as a credit evaluation manner with a slightly poor accuracy but with low costs in place of financial features, but also the accuracy of prediction of credit risks is improved to some extent after the text features are added into the financial features. After the text features are added, the classification accuracy can reach up to 70.6%, and can be improved by 3% by using a random forest classifier. In addition to using a single classifier for classification prediction, this embodiment also introduces the concept of integration of multiple classifiers, to explore further improving the accuracy of classification by means of integration.

2) Impact of the Number and Categories of Text Features on the Effect of Credit Evaluation Classification According to the foregoing experimental result, in credit evaluation, text features can replace financial features to some extent, and the effect of credit evaluation can be improved after text features are added. Therefore, it is further explored whether the number of text features and different categories of text features affect the effect of credit evaluation classification. A logistic classifier and a random forest classifier are respectively used to train different features of the listing loan description text, and comparison is performed with the result of classification by using the control variable: the intrinsic features of the financial loan. As shown in FIG. 4-3, the analysis of the experimental result data shows that for a logistic regression classifier, although the accuracy of the logistic regression classifier is slightly reduced after text features simply counted by statistical features are added, the accuracy is improved after sentiment features and part of speech features are added, and the effect is improved to a greatest extent when the sentiment features are added, and the classification accuracy is obviously improved after all text features are added, and the accuracy is improved by 0.5 percent. However, for a random forest classifier, the accuracy is prominently improved after the text features are added, and is improved by approximately 3% at a highest point. This also proves that the text features can improve the accuracy of credit evaluation classification. However, the result after all features are added is slightly lower than the result after the text statistical features, the sentiment features, and the part of speech features are separately added. The accuracy is not improved as expected after the number of features is increased, and the reason may be that the number of noises also increases with the number increase of features and consequently, the classification effect is reduced, Therefore, it can be seen from data that the text features can improve the accuracy of credit evaluation, and a larger number of text features indicates higher contribution to credit evaluation.

Embodiment 5

Figures 1, 5:
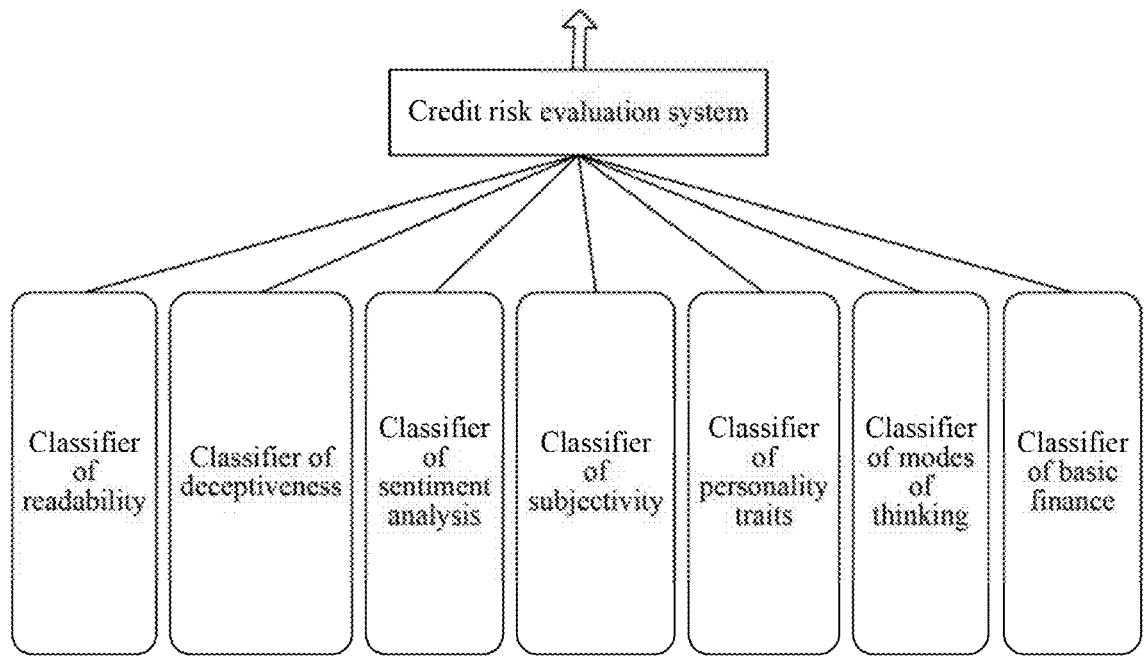
Figures 2, 5:
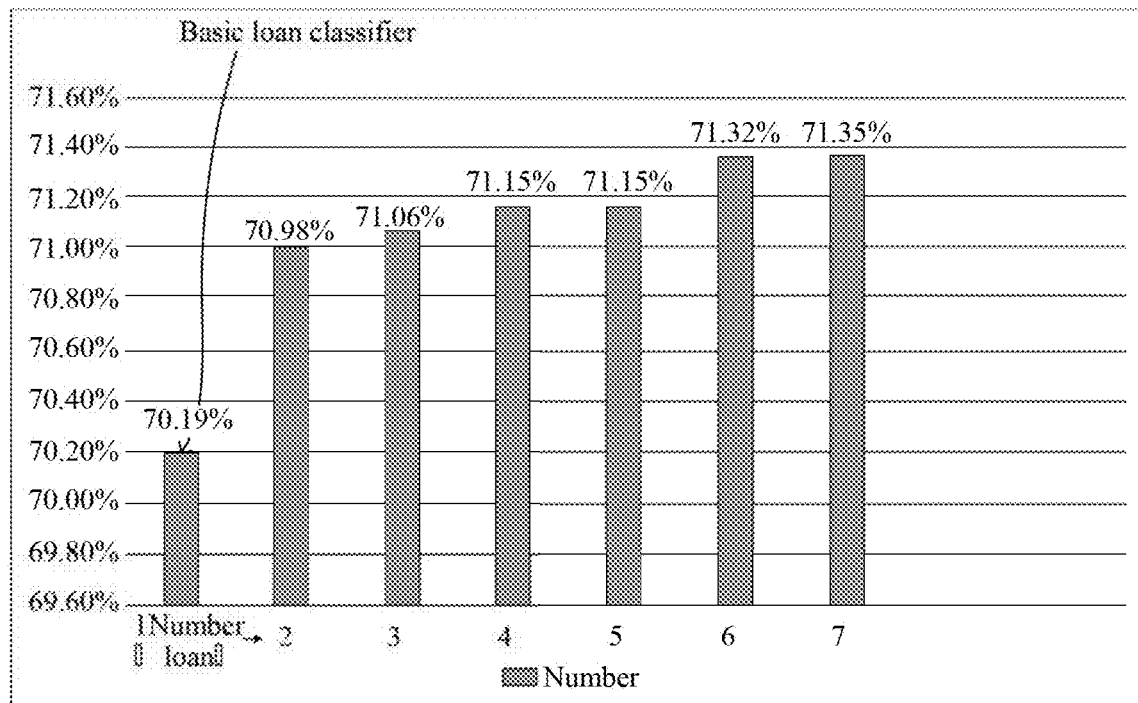

A credit risk evaluation system is designed based on integration of multiple classifiers, as shown in FIG. 5-1. First, seven basic classifiers are established. The seven basic classifiers include six classifiers for text analysis. The six classifiers for text analysis correspond to six abstract text features. The six abstract text features are used to represent various different aspects of a borrower, for example, subjectivity, deceptiveness, text readability, sentiments, and personality traits and modes of thinking of a user. Each classifier receives basic language features as inputs, which can predict whether the borrower breaches a contract, and then outputs of seven classifiers are integrated by using a fusion system.

Logistic regression is used for a classifier of deceptiveness, a classifier of subjectivity, and a classifier of personality traits. Random forest is used for a classifier of readability, a classifier of sentiments, and a basic loan classifier. A multi-layer sensor is used for a classifier of modes of thinking. Decision tree is used for a classifier with different fusion results.

5.1 Experimental Data

The experimental data in this embodiment is derived from a Prosper website, which has a large number of users, and is a famous P2P online service platform. Loan records from 2006 to 2008 are extracted from data provided by the Prosper website, because loan behaviors in this period all have the final repayment results until now, regardless of breach of contract or repayment on time. By means of statistics collection, there are totally 28853 loan records that are available and have clear results within the three years.

The states of the repayment records of Prosper are divided into seven states: current, late, paid, charge-off, defaulted, repurchased, and canceled. Because experimental data is all completed records, the two states: current and late do not exist. Then data is divided into two categories: breach of contract and non-breach of contract. Breach of contract includes two categories: charge-off and defaulted, and there are totally 9937 records of breach of contract: The non-breach of contract includes the remaining several categories, and there are 18916 records of non-breach of contract. A ratio of records of breach of contract to records of non-breach of contract is approximately 1:1.92.

First, 8 basic loan features that describe loans are extracted from the loan records of the database of Prosper. The features are structured features that can be quantified, for example, loan to income ratios, website ratings, and amounts of loans. Because intrinsic features of loans are all directly described by numbers, and most of them are related to the repayment capabilities and wealth levels of borrowers, the features are used as control variables of experiments, and describe the repayment capabilities. The features are respectively shown in Table 5-1:

TABLE 5-1

| | Financial loan features Financial features (8) | |
|---|---|---|
| Credit features | Credit Score Range Lower | Debt To Income Ratio |
| | Credit Score Range Upper | Credit Grade |
| Basic financial | Category | Amount Requested |
| features | Duration | Borrower Maximum Rate |

Secondly, when the borrower applies for a loan, three text application descriptions can be used. The first text application description is a description entry in a listing table that describes the conditions of the borrower and the loan reasons and that is submitted by the borrower, and the description entry is detailed description filled by the borrower for this loan. The remaining two text application descriptions are description and endorsement in a registered user table Member. They respectively describe the conditions of the borrower and the recommendation letter about the borrower. The description text in the listing table is used in this embodiment, and mainly focuses on the description of the borrower for the loan, so as to mine the credit condition of the borrower.

According to the foregoing feature selection and extraction methods, 70 bottom-layer features and combinations are extracted from the text to form 6 abstract text features, and then the features finally input into the model form a feature network. Upper-layer features are represented by the bottom-layer features, represent the abstract meanings of the bottom-layer features, and gradually express the credit level of the borrower.

5.2 Classifiers

The machine learning classifiers involved in this embodiment of the present disclosure are introduced below. 1) Decision tree classifier: by using a measurement manner of an information gain ratio, features with highest information gain ratios are selected to divide data each time. The confidence factor is set as 0.005 to tailor the decision tree. 2) Logistic regression classifier: an optimal regression coefficient is determined by using a Sigmoid function and by using a stochastic gradient ascent method. 3) Neural network classifier: this experiment uses a back-propagation neural network, and the activation function is a Sigmoid function. 4) Random forest classifier: 100 trees are used as composition of the classifier. 5) Naive Bayesian Classifier.

5.3. Experiment 1

Impact of Text Features on the Effect of Credit Evaluation Classification

To research the impact of text features on the effect of credit evaluation classification, in this embodiment, financial feature data, text feature data, and data obtained by combining the financial features with the text features are respectively used as input data to train models and perform tests, and the financial feature data is used as a control variable for reference. The aforementioned five classifiers are used to calculate the accuracy of evaluation performed by the classifier models on credit risks. Because feature addition causes the noise problem, considering that an excessive number of features causes feature overload, and consequently leads to the problem that the classification effect is reduced, feature selection is performed on feature data before model training is performed. Then comparison is performed with the result of the loan feature classification. The final prediction results of three categories of feature data on five classifier models are shown in Table 5-2.

First, the classification result predicted by separately using text features is compared with the classification result predicted by separately using financial features. It is found from data that for most classifier models, although the accuracy of prediction by using text features is lower than the accuracy of prediction by using financial features, the values are close to each other and the difference is not large. Particularly, after feature selection, the accuracy of prediction by using random forest is 67.42%, and is higher than the accuracy of the prediction by using financial features by approximately 0.1%; the result of prediction by using neural network is 67.83%, and the difference with the result 68.37% of prediction by using financial features is within 0.5%. On the other hand, the results of predictions by using financial and text features are both higher than the result of the prediction by separately using financial features to different extents.

TABLE 5-2

Results of use of a single classifier on different feature data

| | Bayes | Logistic | Decision tree | Neural network | Random forest |
|---|---|---|---|---|---|
| Financial features | 69.26% | 70.19% | 69.85% | 68.37% | 67.3% |
| Text features | 67.3% | 67.60% | 68.7% | 67.83% | 67.42% |
| Financial + text features | 69.69% | 70.6% | 70.54% | 69.2% | 70.22% |

5.4 Experiment 2

In this experiment, the performance of a combination of multiple classifiers is evaluated, and knowledge on one aspect is considered in each classifier. In addition to a classifier based on a basic loan function, there are six text classifiers that use text features to describe different aspects of the borrower, including text readability, deceptiveness, subjectivity, sentiments, personality traits, and modes of thinking.

FIG. 5-2 is a diagram of comparison between performances of combinations of different numbers of classifiers according to this embodiment of the present disclosure. As shown in FIG. 5-2, classifiers of three categories: logistic regression, random forest, and neural network are respectively used to independently train data on six classifiers that separately use text features and a classifier that uses financial features, to obtain classification results. A classification result of each category of classifier is used as input of a second-layer classifier, and finally, the final classification result is obtained by means of training of the upper-layer classifier.

When it is finally obtained that the upper-layer classifier uses decision tree, and bottom layers of seven classifiers respectively use corresponding classifiers (deceptiveness: logistic regression; text readability: random forest; sentiments: random forest; modes of thinking: neural network; subjectivity: logistic regression; personality traits: logistic regression; financial analysis: random forest), the accuracy of the classification effect is 71.35%, and is improved by 1% compared with the highest accuracy 70.19% of financial analysis, and is improved by 0.75% compared with the highest accuracy 70.6% of a single classifier. Moreover, it can be seen that with the increase of the number of added text classifiers, the accuracy also increases, and the effect is better that both the effects of the financial analysis and a single classifier on the listing.

By means of analysis of the effect of each multi-classifier integration method, it is obtained that the prediction effect after the multi-classifier integration can be improved to some extent compared with the prediction effect of a single classifier. Finally, the highest accuracy that can be obtained in each multi-classifier integration algorithm is selected as the result of the algorithm, and by means of comparison with the effect of the original financial feature data, data of a comparison result between different multi-classifier integration algorithms can be obtained.

In the foregoing multi-classifier integration algorithms, it can be seen that using different multi-classifier integration algorithms will bring improvements of classification accuracy with different amplitudes. Boosting and bagging are decision fusion based on a same classifier, and their classification effect is slightly worse than the effect of decision fusion by using different classifiers. However, it can be seen from the variance that the classification effect is more stable. Different classifiers are used as basic classifiers, that is, decision providers of decision fusion are different from each other, so that the final result is applicable in different cases in consideration of different aspects, and the obtained final result is more correct. That is, the correct result can be checked by different algorithms, and a larger number of types of algorithms indicate a large probability that the wrong result is identified. Data shows that the improvement of the classification accuracy of a multi-classifier integration algorithm based on weighting and simple voting is higher than the improvements of the classification accuracy of several other decision fusions. Such a parallel integration algorithm using different basic classifiers bestows different weights to the different basic classifiers in consideration of the classification capabilities of the different basic classifiers, so as to obtain a more accurate result of prediction. A mixed classifier aims to resolve different problems, and the reflection of diversity is more obvious after the final decision fusion, and the effect is also best in the multi-classifier integration method implemented in this embodiment.

Based on all of the experimental results, it can be obtained by analysis that the highest accuracy that can be reached by a single classifier by using financial and text features is obtained by using logistic regression, and is 70.6%; and the highest accuracy that can be reached by prediction by using financial features is obtained by using a neural network classifier, and the prediction result is 70.19%. However, after multi-classifier integration, regardless of which algorithm is used, the prediction effect is prominently improved compared with the effect of prediction by using financial features. The amplitude of the improvement of aa mixed classier exceeds 1 percent, and is also improved compared with the effect of prediction by a single classifier by using text and financial features. In addition, because multi-classifier integration is decision fusion made by summarizing results of multiple classifiers, the result of multi-classifier integration also has higher reliability and stability. Therefore, the multi-classifier integration method plays an important role in credit classification of credit evaluation.

5.5. Discussion

The results of Experiment 1 show that the performance of different classifiers in text features is close to conventional loan features, which include FICO scores and debt to income ratios (DTI). The collection and verification costs of FICO scores and DTI are relatively high. In addition, one objective of an online P2P loan is that the service provider has no commercial credit record, that is, no FICO score.

In these cases, it is a good method for evaluating credit risks by selecting text analysis. The results of Experiment 1 and Experiment 2 show that adding text features can improve the performance of the overall credit risk evaluation system. By adding text features that are directly based on random forest into the existing system, the precision thereof may be improved from 67% to 70%. By combining multiple text classifiers and a basic loan classifier, the precision may be further improved to 71%. All of the above shows that text information is a good complementary information source for a conventional financial information source. Financial features such as DTI focus on evaluation of the repayment capability of a borrower, and text features focus on evaluation of the repayment will of the borrower.

5.6. Conclusion

In this embodiment, the credit risks of network P2P loans are evaluated by means of text analysis and overall learning. First, a concept model including six abstract text features is designed, and the six abstract text features explore the thoughts of the borrower from different aspects.

Then, an overall credit risk evaluation system based on seven classifiers is designed. The seven classifiers include 6 classifiers for text analysis corresponding to 6 abstract text functions and one conventional classifier for credit analysis. The experimental results show that texture functions, close to the conventional financial features, of different classifiers include FICO scores, and DTI.

Therefore, text information is a good choice when conventional financial information gradually disappears. In addition, adding text features can improve the performance of the overall credit risk evaluation system, and this means that text information is a good complementary information source of a conventional financial information source, and when text information is combined with conventional information, the performance of credit risk evaluation can be improved.

Embodiment 6

Based on the foregoing embodiments, this embodiment of the present disclosure further provides a credit risk evaluation apparatus based on text analysis. A first obtaining unit, an analysis unit, a processing unit, an output unit, and an establishment unit included in the apparatus and modules included in each unit can all be implemented by a processor in a computing device, and certainly, can also be implemented by a logic circuit. In the implementation, the processor may be a central processing unit (CPU), a micro processing unit (MPU), a digital signal processor (DSP), a field programmable gate array (FPGA), or the like.

Figure 6:
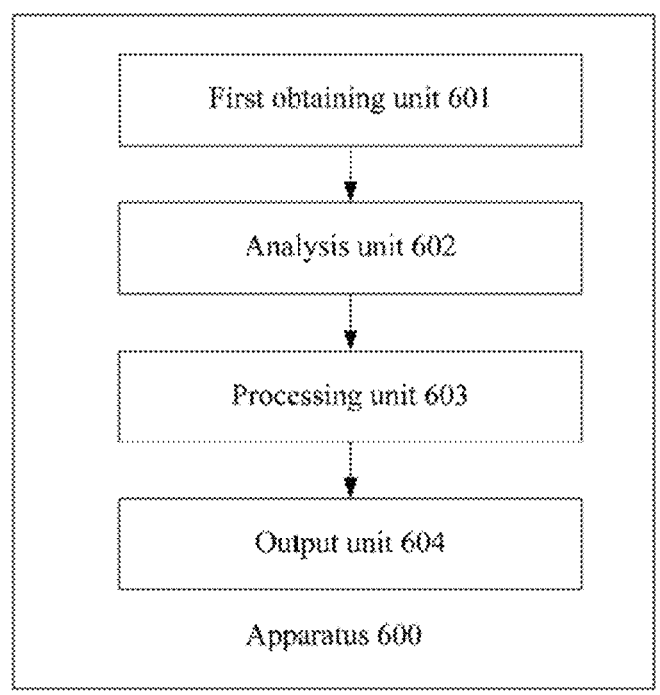
FIG. 6 is a schematic structural diagram of a credit risk evaluation apparatus based on text analysis according to an embodiment of the present disclosure.

FIG. 6 is a schematic structural diagram of the credit risk evaluation apparatus based on text analysis according to Embodiment 6 of the present disclosure. As shown in FIG. 6, the apparatus 600 includes a first obtaining unit 601, an analysis unit 602, a processing unit 603, and an output unit 604.

The first obtaining unit 601 is configured to obtain text of a borrower.

The analysis unit 602 is configured to analyze the text to obtain basic language features, the basic language features being used to predict whether the borrower breaches a contract.

The processing unit 603 is configured to input the basic language features into a preset credit risk evaluation model, to obtain a credit risk value, output from the credit risk evaluation model, of the borrower.

The output unit 604 is configured to output the credit risk value of the borrower.

In this embodiment of the present disclosure, the apparatus further includes: an establishment unit, configured to establish the credit risk evaluation model, and the establishment unit further includes an obtaining module, an analysis module, a first establishment module, and a fusion module.

The obtaining module is configured to obtain training data.

The analysis module is configured to analyze the training data to obtain basic language features of the training data.

The first establishment module is configured to use the basic language features as a parameter, and establish classifiers corresponding to different abstract text features by using a machine learning method.

The fusion module is configured to use the classifiers as basic classifiers, and perform decision fusion by using a decision tree algorithm to form the credit risk evaluation model.

In this embodiment of the present disclosure, using the basic language features as a parameter by the first establishment module includes: inputting the basic language features into the classifier corresponding to each of the abstract text features according to relationships between the basic language features and the abstract text features.

In this embodiment of the present disclosure, the establishment unit further includes a segmentation module and a statistical module; the segmentation module is configured to segment the training data according to punctuations, and the statistical module is configured to collect statistics on the segmented training data to obtain statistical features.

In this embodiment of the present disclosure, the establishment unit further includes a second establishment module and a determining module.

The second establishment module is configured to establish classifiers corresponding to a same abstract text feature by using different machine learning methods.

The determining module is configured to determine a classifier having a highest accuracy as a classifier corresponding to the abstract text feature.

It is noted herein that the description of the foregoing apparatus embodiment is similar to the description of the foregoing method embodiment, and the apparatus embodiment has beneficial effects similar to those of the method embodiment, and therefore details are not described. Refer to the description of the method embodiment of the present disclosure to understand the technical details that are not disclosed in the apparatus embodiment of the present disclosure, and therefore details are not described.

It is noted that in the embodiments of the present disclosure, if the foregoing credit risk evaluation method based on text analysis is implemented in the form of a software functional unit, and is sold or used as an independent product, the method may be stored in a computer-readable storage medium. Based on such an understanding, the technical solutions of the embodiments of the present disclosure essentially, or the part contributing to the existing technology may be reflected in a form of a software product. The computer software product is stored in a storage medium and includes several instructions for instructing a computer device (which may be a personal computer, a server, a network device, or the like) to perform all or apart of the methods of various embodiments of the present disclosure. The foregoing storage medium includes: any medium that can store program codes, such as a USB flash drive, a removable hard disk, a read-only memory (ROM), a magnetic disk, or an optical disc. In this way, the embodiments of the present disclosure are not limited by any combination of specific hardware and software.

It is noted that the various modules, submodules, units, subunits, and components in the present disclosure can be implemented using any suitable technology. In an example, a module or a unit can be implemented using integrated circuit (IC). In another example, a module or a unit can be implemented as processing circuitry executing software instructions. In another example, interface circuitry is used to implement obtaining unit.

Correspondingly, an embodiment of the present disclosure further provides a computer storage medium, storing a computer executable instruction, used to perform the credit risk evaluation method based on text analysis provided in this embodiment of the present disclosure.

It is understood that "one embodiment" or "an embodiment" mentioned in the overall specification means that specific features, structures, or attributes related to the embodiment are included in at least one embodiment of the present disclosure. Therefore, "in one embodiment" or "in an embodiment" that occurs in various parts of the specification does not necessarily refer to the same embodiment. In addition, the specific features, structures, or attributes may be combined in one or more embodiments in any suitable manner. It is understood that sequence numbers of the foregoing processes do not mean execution sequences in various embodiments of the present disclosure. The execution sequences of the processes are determined according to functions and internal logic of the processes, and should not be construed as any limitation on the implementation processes of the embodiments of the present disclosure. The sequence numbers of the foregoing embodiments of the present disclosure are merely for the convenience of description, and do not imply the preference among the embodiments.

It is noted that, in this embodiment, the terms "include", "comprise", and any variants thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Unless otherwise specified, an element limited by "include a/an . . . " does not exclude other same elements existing in the process, the method, the article, or the device that includes the element.

In the several embodiments provided in this application, it is understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and the parts displayed as units may or may not be physical units, may be located in one position, or may be distributed on a plurality of network units. A part of or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in the form of hardware, or may be implemented in the form of hardware and a software functional unit.

A person of ordinary skill in the art may understand that all or some of the steps of the foregoing method embodiments may be implemented by using a program instructing relevant hardware. The foregoing program may be stored in a computer readable storage medium. When the program is executed, steps of the foregoing method embodiments are performed. The foregoing storage medium includes: any medium that can store program codes, such as a mobile storage device, an ROM, a magnetic disk, or an optical disc.

Alternatively, when the foregoing integrated unit of the present disclosure is implemented in a form of a software functional module and sold or used as an independent product, the integrated unit may be stored in a computer-readable storage medium. Based on such an understanding, the technical solutions of the embodiments of the present disclosure essentially, or the part contributing to the existing technology may be reflected in a form of a software product.

The computer software product is stored in a storage medium and includes several instructions for instructing a computer device (which may be a personal computer, a server, a network device, or the like) to perform all or a part of the methods of various embodiments of the present disclosure. The foregoing storage medium includes: any medium that can store program code, such as a mobile storage device, an ROM, a magnetic disk, or an optical disc.

The foregoing descriptions are merely, specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the appended claims.

INDUSTRIAL APPLICABILITY

In the embodiments of the present disclosure, by obtaining text of a borrower; analyzing the text to obtain basic language features, the basic language features being used to predict whether the borrower breaches a contract; inputting the basic language features into a preset credit risk evaluation model, to obtain a credit risk value, output from the credit risk evaluation model, of the borrower; and outputting the credit risk value of the borrower, the credit risk of the borrower can be effectively evaluated, so as to provide important decision basis for an investor during investment.

What is claimed is:

1. An information processing apparatus, comprising:
    interface circuitry configured to obtain a text authored by a person;
    processing circuitry configured to:
        analyze the text to obtain measurements of language features of the person, the text authored by the person included in a communication between the person and a provider;
        input the measurements of the language features into an evaluation model that is trained to predict a score as a function of the language features, the evaluation model trained before the text authored by the person is obtained, the evaluation model trained based on historical loan records including text of an agreement executed between the person and the provider;
        determine a specific score for the person based on the evaluation model; and
        output the specific score of the person for predicting a likelihood of the person following the agreement.

2. The information processing apparatus according to claim 1, wherein
    the processing circuitry is configured to:
        obtain training data via the interface circuitry;
        analyze the training data to obtain training measurements of the language features from the training data;
        use the training measurements of the language features as parameters to establish classifiers corresponding to abstract text features by machine learning; and
        fuse the classifiers into a decision tree to form the evaluation model.

3. The information processing apparatus according to claim 2, wherein
    the processing circuitry is configured to:
        input the training measurements of the language features into a classifier corresponding to an abstract text feature according to mapping relationships between the language features and the abstract text features.

4. The information processing apparatus according to claim 2, wherein
    the processing circuitry is configured to:
        segment the training data according to punctuations; and
        collect statistics on the segmented training data to obtain statistical features.

5. The information processing apparatus according to claim 2, wherein
    the processing circuitry is configured to:
        establish a plurality of classifiers corresponding to a same abstract text feature by different machine learning methods; and
        determine, from the plurality of classifiers, a classifier having a highest accuracy as the classifier corresponding to the same abstract text feature.

6. A scoring method of an information processing apparatus, the method comprising:
    obtaining a text authored by a person;
    analyzing, by circuitry of the information processing apparatus, the text to obtain measurements of language features of the person, the text authored by the person included in a communication between the person and a provider;
    inputting the measurements of the language features into an evaluation model that is trained to predict a score as a function of the language features, the evaluation model trained before the text authored by the person is obtained, the evaluation model trained based on historical loan records including text of an agreement executed between the person and the provider;
    determining a specific score for the person based on the evaluation model; and
    outputting the specific score of the person for predicting a likelihood of the person following the agreement.

7. The scoring method according to claim 6, further comprising:
    obtaining training data;
    analyzing the training data to obtain training measurements of the language features from the training data;
    using the training measurements of the language features as parameters to establish classifiers corresponding to abstract text features by machine learning; and
    fusing the classifiers into a decision tree to form the evaluation model.

8. The scoring method according to claim 7, wherein the language features comprise at least one of: statistical features, part of speech features, sentiment features, physical features, and tense features of text; the statistical features comprise at least one of:
sentence features, word features and punctuation features; the sentence features comprise at least one of: a total number of sentences, an average sentence length, a maximum sentence length, and a ratio of a number of interrogative sentences; the word features comprise at least one of: an average word length, a category and a number of longest words, a total number of words, an average number of times of occurrence of words, and a maximum number of times of occurrence of words; and the punctuation features comprise at least one of: a ratio of a number of question marks and a ratio of a number of exclamation marks.

9. The scoring method according to claim 7, wherein the abstract text features comprise deceptiveness, subjectivity, sentiments, readability, personality traits, and modes of thinking.

10. The scoring method according to claim 7, wherein the using the training measurements of the language features as the parameters to establish the classifiers corresponding to the abstract text features by machine learning comprises:
   inputting the measurements of the language features into a classifier corresponding to an abstract text feature according to mapping relationships between the language features and the abstract text features.

11. The scoring method according to claim 7, further comprising:
   segmenting the training data according to punctuations; and
   collecting statistics on the segmented training data to obtain statistical features.

12. The scoring method according to claim 11, wherein the punctuations comprise at least one of: a full stop, a question mark, and an exclamation mark.

13. The scoring method according to claim 7, further comprising:
   establishing a plurality of classifiers corresponding to a same abstract text feature by different machine learning methods; and
   determining, from the plurality of classifiers, a classifier having a highest accuracy as the classifier corresponding to the same abstract text feature.

14. The scoring method according to claim 13, wherein the machine learning methods include two or more of: an artificial neural network method, a support vector machine method, a decision tree method, a Bayesian method, a random forest method, and a logistic regression method.

15. The scoring method according to claim 14, further comprising:
   using a classifier established by the logistic regression method as a basic classifier.

16. A non-transitory computer-readable medium storing instructions which when executed by a computer cause the computer to perform a scoring method, the scoring method comprising:
   obtaining a text authored by a person;
   analyzing the text to obtain measurements of language features of the person, the text authored by the person included in a communication between the person and a provider;
   inputting the measurements of the language features into an evaluation model that is trained to predict a score as a function of the language features, the evaluation model trained before the text authored by the person is obtained, the evaluation model trained based on historical loan records including text of an agreement executed between the person and the provider;
   determining a specific score for the person based on the evaluation model; and
   outputting the specific score of the person for predicting a likelihood of the person following the agreement.

17. The non-transitory computer-readable medium according to claim 16, the method further comprising:
   obtaining training data;
   analyzing the training data to obtain training measurements of the language features from the training data;
   using the training measurements of the language features as parameters to establish classifiers corresponding to abstract text features by machine learning; and
   fusing the classifiers into a decision tree to form the evaluation model.

18. The non-transitory computer-readable medium according to claim 17, wherein the step of using the training measurements of the language features as the parameters to establish the classifiers corresponding to the abstract text features by machine learning comprises:
   inputting the training measurements of the language features into a classifier corresponding to an abstract text feature according to mapping relationships between the language features and the abstract text features.

19. The non-transitory computer-readable medium according to claim 17, the method further comprising:
   segmenting the training data according to punctuations; and
   collecting statistics on the segmented training data to obtain statistical features.

20. The non-transitory computer-readable medium according to claim 17, the method further comprising:
   establishing a plurality of classifiers corresponding to a same abstract text feature by different machine learning methods; and
   determining, from the plurality of classifiers, a classifier having a highest accuracy as the classifier corresponding to the same abstract text feature.

* * * * *